United States Patent
Dong et al.

(10) Patent No.: US 8,028,776 B2
(45) Date of Patent: Oct. 4, 2011

(54) INTEGRATED HYDROSTATIC TRANSMISSION FOR LEFT AND RIGHT WHEEL DRIVE

(75) Inventors: Xingen Dong, Farmington, CT (US); Barun Acharya, Johnson City, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 12/641,615

(22) Filed: Dec. 18, 2009

(65) Prior Publication Data

US 2011/0067934 A1  Mar. 24, 2011

Related U.S. Application Data

(63) Continuation of application No. 11/761,651, filed on Jun. 12, 2007, now abandoned, which is a continuation-in-part of application No. 11/563,122, filed on Nov. 24, 2006, now abandoned.

(51) Int. Cl.
  *B62D 11/02* (2006.01)
  *B60K 7/00* (2006.01)
  *B60K 17/14* (2006.01)
(52) U.S. Cl. .................... 180/6.48; 180/308; 60/487
(58) Field of Classification Search .......... 180/6.48, 180/308; 60/464, 487, 488; 417/269, 270, 417/271
  See application file for complete search history.

(56) References Cited

U.S. PATENT DOCUMENTS

| | | |
|---|---|---|
| 2,834,297 A | 5/1958 | Postel et al. |
| 2,936,589 A | 5/1960 | Quintilian |
| 2,988,007 A | 6/1961 | Quintilian |
| 3,090,456 A | 5/1963 | Blenkle |
| 3,493,067 A | 2/1970 | Rumsey |
| 3,643,434 A | 2/1972 | Widmaier |
| 3,890,783 A | 6/1975 | Allen et al. |
| 3,949,824 A | 4/1976 | Bennett |
| 4,064,766 A | 12/1977 | Rinaldo |
| 4,070,219 A | 1/1978 | Farnam |
| 4,071,106 A | 1/1978 | Junck et al. |
| 4,171,559 A | 10/1979 | Vyse et al. |
| 4,285,643 A | 8/1981 | White |
| 4,580,646 A | 4/1986 | Tokunaga |
| 4,616,478 A | 10/1986 | Jensen |
| 4,627,237 A | 12/1986 | Hutson |
| 4,843,817 A | 7/1989 | Shivvers et al. |
| 4,845,949 A | 7/1989 | Shivvers et al. |
| 4,870,820 A | 10/1989 | Nemoto |
| 4,903,792 A | 2/1990 | Ze-ying |
| 4,936,095 A | 6/1990 | Ross et al. |
| 5,018,351 A | 5/1991 | Otte |

(Continued)

OTHER PUBLICATIONS

"Integrated Zero-Turn Transaxle", Brocure.

(Continued)

*Primary Examiner* — Kevin Hurley
*Assistant Examiner* — Marc Scharich
(74) *Attorney, Agent, or Firm* — Renner, Otto, Boisselle & Sklar, LLP (57) ABSTRACT

A hydrostatic transmission mountable to a frame of a vehicle for driving a left side or right side drive wheel. A motor portion of the transmission can extend outwardly from the frame and a pump portion can extend upwardly from the frame. The motor portion can be configured to be at least partially received within a wheel for direct mounting of the wheel to an output shaft of the motor. The pump portion can include an input shaft extending from a lower side thereof for connection to a prime mover, such as an internal combustion engine.

23 Claims, 11 Drawing Sheets

U.S. PATENT DOCUMENTS

| | | |
|---|---|---|
| 5,181,837 A | 1/1993 | Niemiec |
| 5,205,123 A | 4/1993 | Dunstan |
| 5,317,936 A | 6/1994 | Shiba et al. |
| 5,356,347 A | 10/1994 | Komura et al. |
| 5,373,697 A | 12/1994 | Jolliff et al. |
| 5,497,623 A | 3/1996 | Hauser et al. |
| 5,557,931 A | 9/1996 | Hauser et al. |
| 5,622,051 A | 4/1997 | Lida et al. |
| 5,918,691 A | 7/1999 | Ishii |
| 5,921,151 A | 7/1999 | Louis et al. |
| 5,950,500 A | 9/1999 | Okada et al. |
| 5,979,270 A | 11/1999 | Thoma et al. |
| 6,010,423 A | 1/2000 | Jolliff et al. |
| 6,030,182 A | 2/2000 | Voigt |
| RE36,807 E | 8/2000 | Okada |
| 6,152,247 A | 11/2000 | Sporrer et al. |
| 6,209,928 B1 | 4/2001 | Benett et al. |
| 6,220,377 B1 | 4/2001 | Lansberry |
| 6,233,929 B1 | 5/2001 | Okada et al. |
| 6,237,332 B1 | 5/2001 | Thoma et al. |
| 6,343,471 B1 | 2/2002 | Thoma et al. |
| 6,427,442 B2 | 8/2002 | Thoma et al. |
| 6,427,443 B2 | 8/2002 | Smothers et al. |
| 6,481,203 B1 | 11/2002 | Johnson et al. |
| 6,487,856 B1 | 12/2002 | Ohashi et al. |
| 6,487,857 B1 | 12/2002 | Poplawski et al. |
| 6,508,059 B1 | 1/2003 | Takada et al. |
| 6,554,084 B1 | 4/2003 | Enmeiji |
| 6,564,550 B2 | 5/2003 | Thoma et al. |
| 6,598,694 B2 | 7/2003 | Forster |
| 6,643,959 B2 | 11/2003 | Jolliff et al. |
| 6,672,058 B1 | 1/2004 | Langenfeld et al. |
| 6,672,843 B1 | 1/2004 | Holder et al. |
| 6,688,417 B2 | 2/2004 | Hansell |
| 6,694,729 B1 | 2/2004 | Trimble |
| 6,715,284 B1 | 4/2004 | Poplawski et al. |
| 6,782,797 B1 | 8/2004 | Brandenburg et al. |
| 6,804,958 B1 | 10/2004 | Poplawski et al. |
| 6,817,960 B2 | 11/2004 | Jolliff et al. |
| 6,843,056 B1 | 1/2005 | Langenfeld et al. |
| 6,955,046 B1 | 10/2005 | Holder et al. |
| 6,973,783 B1 | 12/2005 | Hauser et al. |
| 7,036,311 B2 | 5/2006 | Hauser et al. |
| 7,308,790 B1 | 12/2007 | Bennett et al. |
| 7,316,287 B2 | 1/2008 | Ohashi et al. |
| 2002/0179340 A1 | 12/2002 | Jolliff et al. |
| 2003/0070429 A1 | 4/2003 | Jolliff et al. |
| 2003/0116936 A1 | 6/2003 | Felsing et al. |
| 2006/0039801 A1 | 2/2006 | Dong et al. |
| 2007/0017712 A1 | 1/2007 | Dunn |
| 2007/0137918 A1 | 6/2007 | Dong et al. |

OTHER PUBLICATIONS

Ross Gear, Hydro-Gear, "TRW Ross Gear Torqdrive Axel", Brochure.
Office Action for U.S. Appl. No. 11/183,177 dated Jan. 18, 2008.
Office Action for U.S. Appl. No. 11/183,177 dated Aug. 19, 2008.
Office Action for U.S. Appl. No. 11/183,177 dated Mar. 5, 2009.
Office Action for U.S. Appl. No. 11/183,177 dated Jun. 22, 2009.
Office Action for U.S. Appl. No. 11/563,122 dated Mar. 31, 2009.

INTEGRATED HYDROSTATIC TRANSMISSION FOR LEFT AND RIGHT WHEEL DRIVE

RELATED APPLICATIONS

This application is a continuation of U.S. application Ser. No. 11/761,651 filed on Jun. 12, 2007 now abandoned, which is a continuation-in-part of U.S. application Ser. No. 11/563,122 filed on Nov. 24, 2006 now abandoned, both of which are hereby incorporated herein by reference in their entirety.

FIELD OF THE INVENTION

The present invention relates generally to hydraulic power units. More particularly, the invention relates to hydrostatic transmissions for use in vehicles, such as mowing machines.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is typically connected through suitable gearing to the vehicle's wheels or tracks.

SUMMARY OF THE INVENTION

The present invention provides a hydrostatic transmission mountable to a frame of a vehicle for directly driving a left side or a right side drive wheel. A motor portion of the transmission can extend outwardly from the frame, and a pump portion can extend upwardly from the frame when mounted thereto. The motor portion can be configured to be at least partially received within a wheel for direct mounting of the wheel to an output shaft of the motor. The pump portion can include an input shaft extending from a lower side thereof for connection to a prime mover, such as an internal combustion engine.

More particularly, a hydrostatic transmission for driving a drive wheel of a vehicle comprises a housing assembly mountable as a unit to a frame of a vehicle for driving a left side or right side drive wheel. A pump is supported within a pump portion of the housing and configured to be driven by an input shaft of the hydrostatic transmission. A motor is supported within a motor portion of the housing and connected to the pump via supply and return lines, the motor configured to drive an output shaft of the hydrostatic transmission. The housing assembly includes a mounting surface for enabling the hydrostatic transmission to be secured to the frame such that the output shaft and motor portion of the housing extend outwardly from the frame so that when the output shaft is connected to a drive wheel, the motor portion of the housing can be at least partially received withing the wheel. The pump portion of the housing extends upwardly from the frame.

In one embodiment, the output shaft extends from the housing assembly along a central transverse axis of the housing assembly such that the housing assembly extends fore and aft of the output shaft generally the same distance. The housing assembly has a general T-shape with the output shaft forming a stem portion of the T-shape, and the output shaft is configured to be an axle for supporting a wheel. A trunnion arm for controlling the pump extends from a side of the housing assembly transversely opposite the output shaft. The pump is a variable flow reversible piston pump and the motor is a gerotor motor.

According to another aspect of the invention, a vehicle comprises a frame, a first hydrostatic transmission supported by the frame, the hydrostatic transmission having a housing assembly and a rotatably driven output shaft, a first wheel mounted to the output shaft of the first hydrostatic transmission for supporting the vehicle for movement over a surface, the first wheel located on a first side of the vehicle, a second hydrostatic transmission supported by the frame, the hydrostatic transmission having a housing assembly and a rotatably driven output shaft, and a second wheel mounted to the output shaft of the second hydrostatic transmission for supporting the vehicle for movement over a surface, the second wheel located on a second side of the vehicle opposite the first side. The first and second hydrostatic units are identical.

In one embodiment, the first and second hydrostatic transmissions have an input shaft extending from the housing assembly perpendicularly to the output shaft. The output shaft of the first and second hydrostatic transmissions extend from the housing assembly along a central transverse axis of the housing assembly such that the housing assembly extends fore and aft of the output shaft generally the same distance. The housing assembly of each hydrostatic transmission has a general T-shape with the output shaft forming part of a stem portion of the T-shape, and a distal end of each output shaft is configured to be an axle for supporting a respective wheel.

The housing assembly of each hydrostatic transmission has a motor portion that extends outboard of the frame and is at least partially received within a rim of a respective wheel. Each hydrostatic transmission further includes a trunnion arm for controlling speed and direction of rotation of the output shaft, the trunnion arm extending from the housing assembly on the same side as the output shaft. An input drive wheel can be connected to the input shaft on a lower side of the pump portion of the housing.

According to another aspect of the invention, a vehicle comprises a frame, a first hydrostatic transmission supported by the frame and configured to drive a first drive wheel mounted on a first side of the vehicle, and a second hydrostatic transmission supported by the frame and configured to drive a second drive wheel mounted on a second side of the vehicle opposite the first side. The first and second hydrostatic units each comprise a housing assembly mountable as a unit to a frame of the vehicle, a pump supported within a pump portion of the housing and configured to be driven by an input shaft of the hydrostatic transmission, and a motor supported within a motor portion of the housing and connected to the pump via supply and return lines, the motor configured to drive the output shaft of the hydrostatic transmission. The housing assembly includes a mounting surface for securing the hydrostatic transmission to the frame such that the output shaft and motor portion of the housing extend outwardly from the frame and are at least partially received within the wheel, and the pump portion of the housing extends upwardly from the mounting surface.

Further features of the invention will become apparent from the following detailed description when considered in conjunction with the drawings.

DETAILED DESCRIPTION

Figure 1:
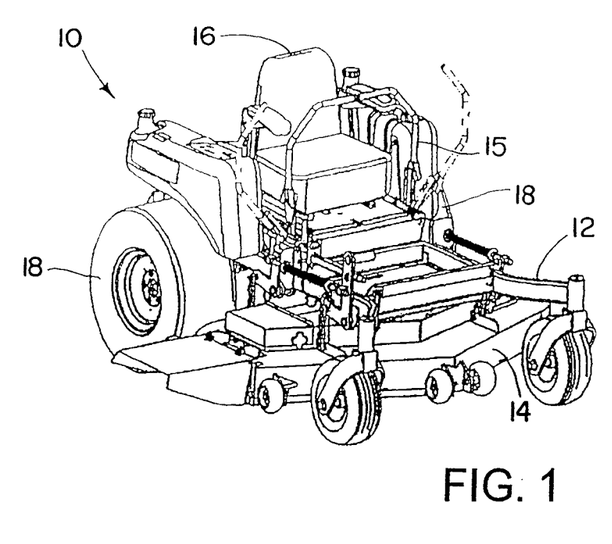
FIG. 1 is an exemplary zero-turn-radius mower in accordance with the invention.
Figure 2:
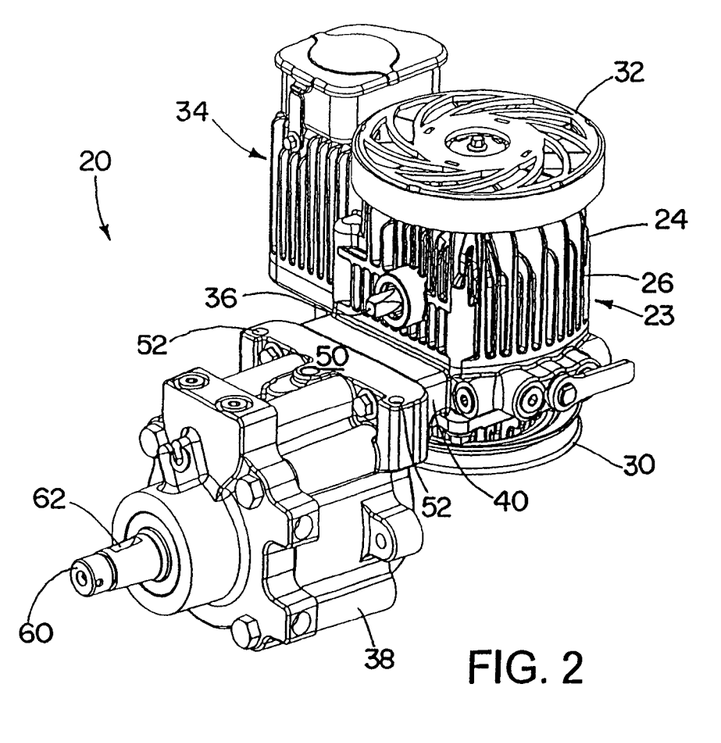
FIG. 2 is a perspective view of an exemplary hydrostatic transmission in accordance with the invention.
Figure 3:
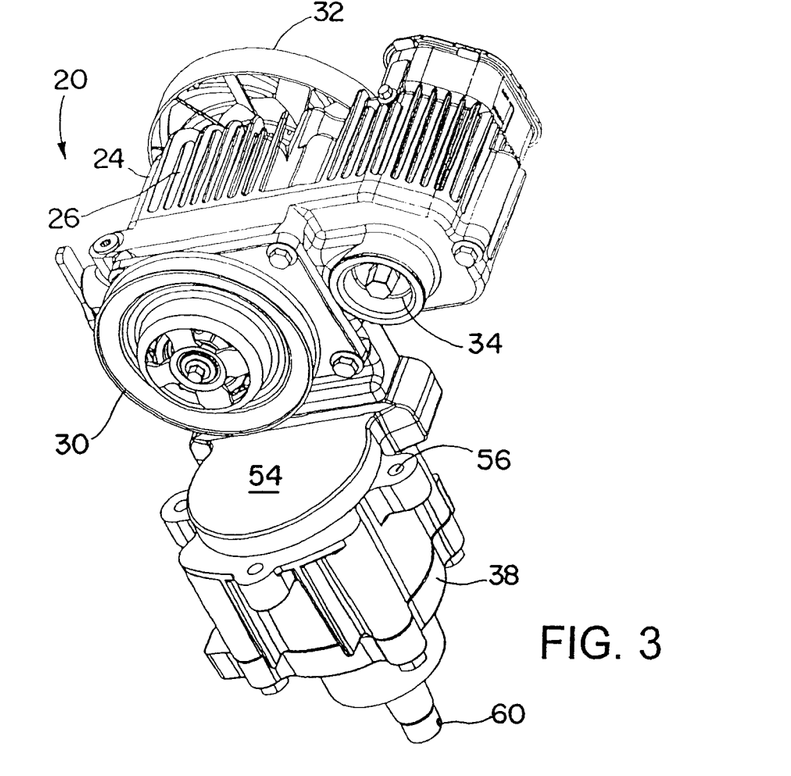
FIG. 3 is another perspective view of the hydrostatic transmission of FIG. 1.
Figure 4:
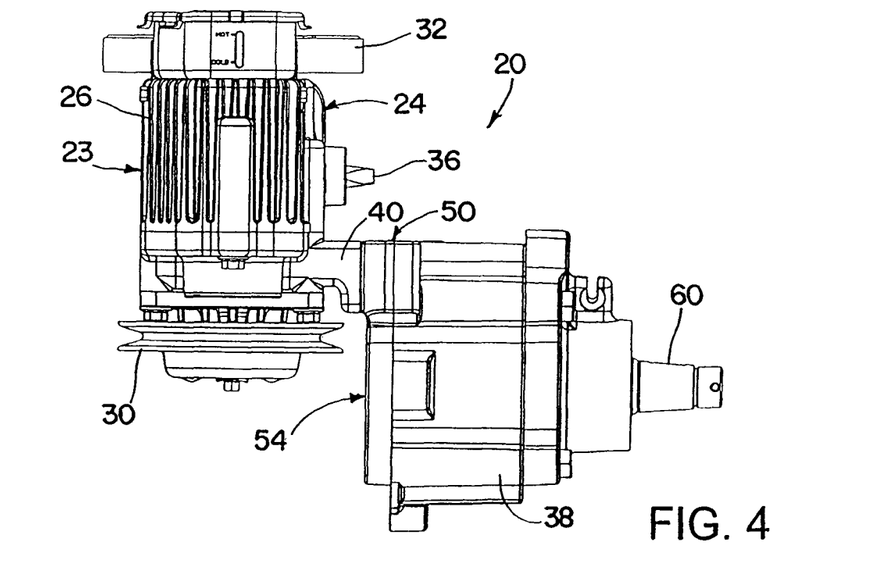
FIG. 4 is a front (or rear) elevational view of the hydrostatic transmission of FIG. 1.
Figure 5:
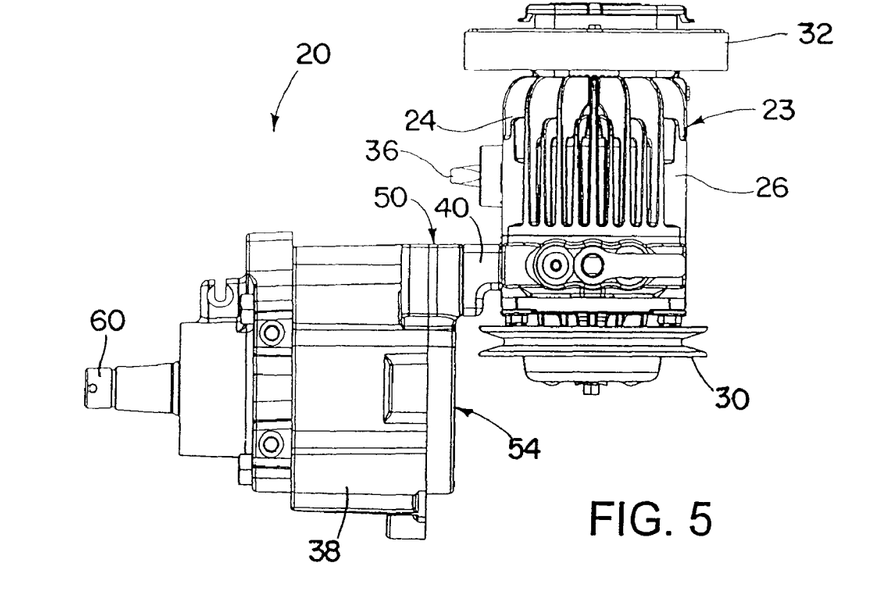
FIG. 5 is a rear (or front) elevational view of the hydrostatic transmission of FIG. 1.
Figure 6:
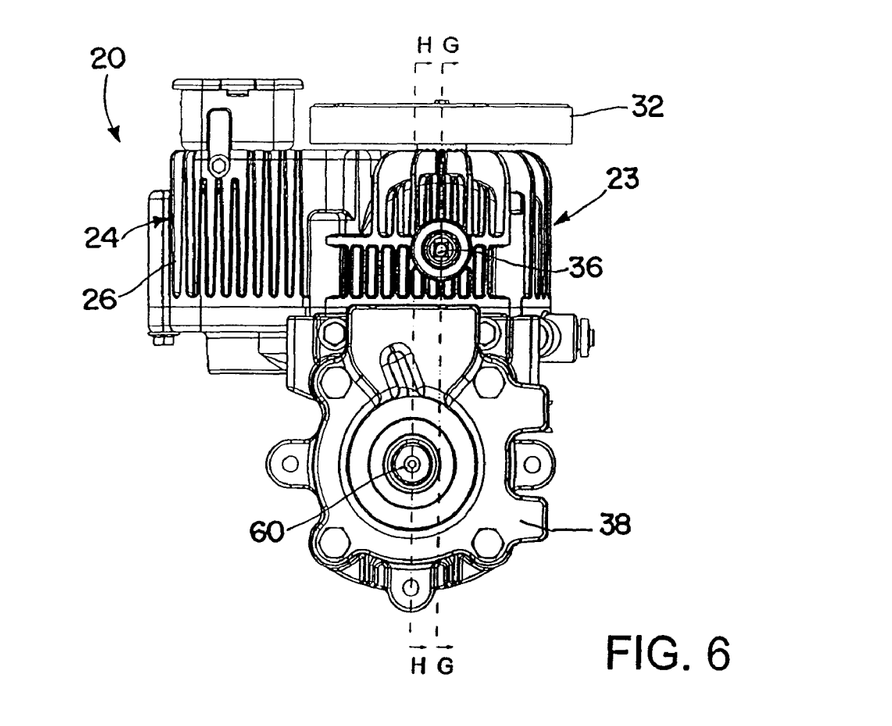
FIG. 6 is a side elevational view of the hydrostatic transmission of FIG. 1.
Figure 7:
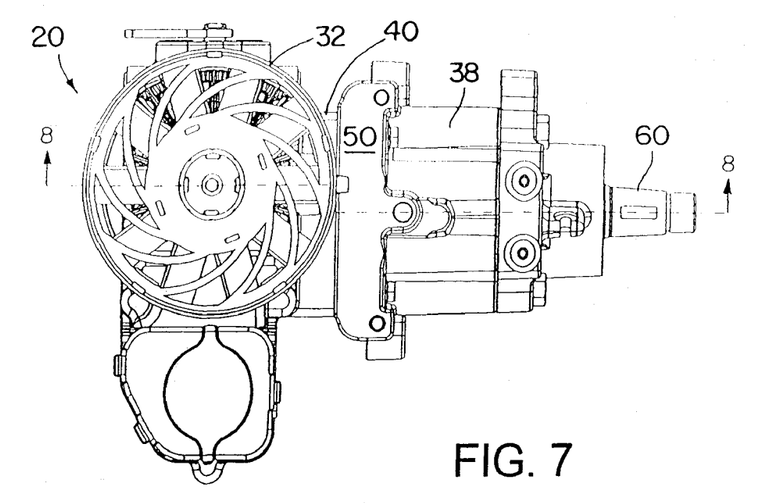
FIG. 7 is a top view of the hydrostatic transmission of FIG. 1.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 16, and a plurality of controls 15 for operating the mower 10. A rear mounted engine mounted to the frame 12 behind the seat 16 provides power to first and second hydrostatic transmissions (engine and hydrostatic transmissions not shown in FIG. 1) also mounted to the frame 12. The hydrostatic transmissions can be controlled by an operator to independently drive respective rear wheels 18 to propel the mower and provide zero-turn-radius functionality. The design of the illustrated mower 10 is merely exemplary in nature, and it will be appreciated that other mower designs and vehicle types can be used in accordance with the invention.

Turning to FIGS. 2-8, an integrated hydrostatic transmission (IHT) 20 is illustrated. The IHT 20 includes a pump 21 connected to a motor 22 (see FIG. 8) and supported within a housing 23. The IHT 20 is mountable to the frame 12 of the mower 10 as a unit, as will be described.

The pump 21 is located within a pump housing portion 24 of the hydrostatic transmission housing 23. The pump 21 in the hydrostatic transmission of FIGS. 2-10 is a piston pump, but other types of pumps can be used. The pump housing portion 24 includes a plurality of cooling fins 26 for dissipating heat generated by the hydrostatic transmission 20.

A pump shaft 28 is supported by the pump housing portion 24 and is configured to drive the pump 21. The pump shaft 28 extends from opposite sides of the pump housing portion 24. A input (drive) pulley 30 is provided on the lower end of the shaft 28 for connection via a belt, or other suitable means, to a prime mover such as the internal combustion engine of the mower 10. A fan 32 is secured to the upper end of the pump shaft 28 and is configured to circulate air around the hydrostatic transmission 20 for cooling purposes.

Also contained within the pump housing portion 24 is an internal oil filter 34 for filtering the fluid of the hydrostatic transmission 20. As will be described in connection with FIGS. 9-12, the location of the oil filter 34 on a lower surface of the pump housing portion 24 facilitates changing of the transmission fluid by removal of the oil filter 34. Alternatively, an external oil filter could be provided.

A trunnion arm 36 extends through the pump housing portion 24 and is configured to actuate a swash plate to control the flow direction and flow rate of the pump 21 in a conventional manner. The trunnion 36 extends from the pump housing portion 24 on an outboard side of the IHT 20 when the IHT is mounted on a vehicle. The trunnion 36 can be connected to the controls 15 (e.g., a steering lever, typically at an outboard location of the mower) of the mower 10 directly or via a suitable linkage.

The pump housing portion 24 is connected to a motor housing portion 38 containing motor 22 via a bridge member 40. In the illustrated embodiment, the bridge member 40 is part of the pump housing portion 24. Alternatively, the bridge member 40 could be part of the motor housing portion 38, or a separate member to which both the pump housing portion 24 and the motor housing portion 38 connect. The bridge member 40 contains passageways (e.g., supply and return lines) for the supply and return of the fluid between the pump 21 and motor 22.

The motor 22 is supported within the motor housing portion 38. The motor housing portion 38 includes a mounting surface 50 which can be butted against a frame member of a vehicle for securing the hydrostatic transmission 20 to the frame using bolts inserted through the frame and into bolt holes 52. An end plate 54 of the motor housing portion 38 has bolt holes 56 associated therewith for further securing the hydrostatic transmission 20, for example, in the manner described in more detail below.

A motor output shaft 60 extends from the motor housing portion 38 and is supported therein by one or more bearings. The motor output shaft 60 includes a key way 62 for receiving a key for securing a hub of a wheel directly to the output shaft 60 for rotation therewith.

Figure 8:
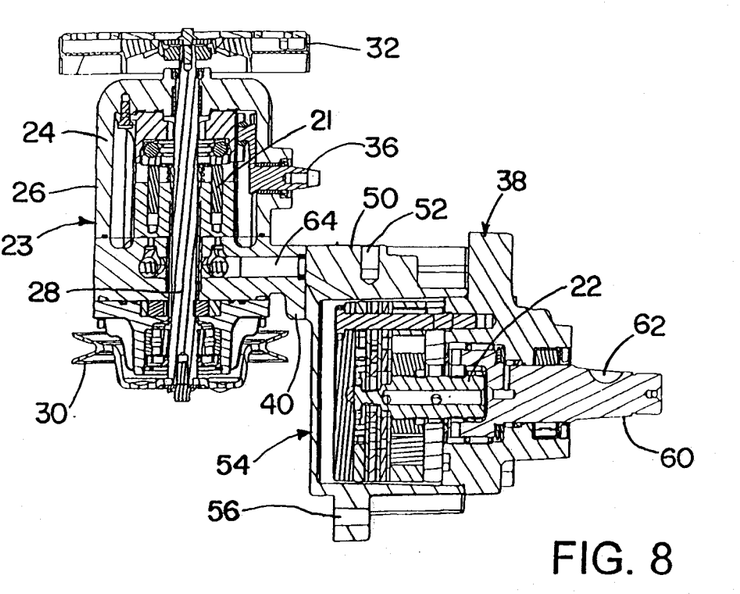
FIG. 8 is a cross-sectional view of the hydrostatic transmission taken along the line 8-8 in FIG. 7.

FIG. 8 illustrates the interior of the hydrostatic transmission 20. As described, the pump 21 and motor 22 are supported within respective pump housing portion 24 and motor housing portion 38 of the transmission housing 23. A pair of interior passageways 64 connect the pump 21 and motor 22 for the supply and return of fluid.

Figure 9:
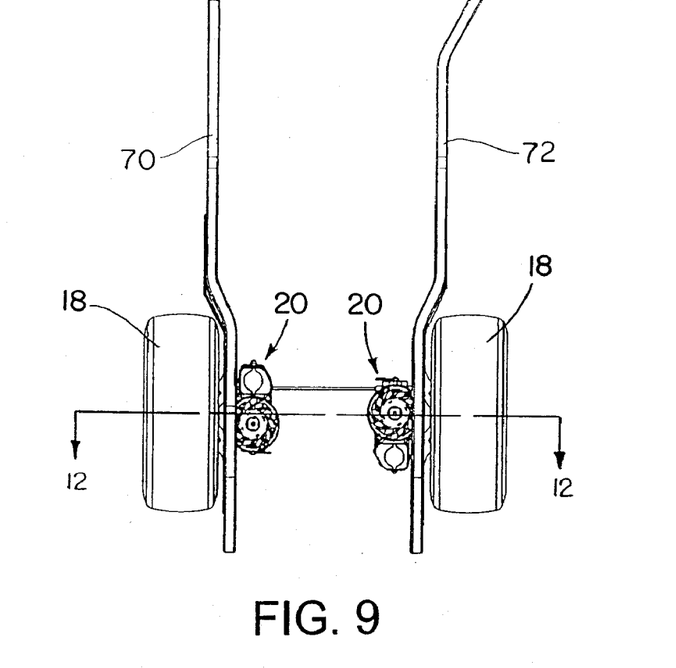
FIG. 9 is a top view of a frame of the mower of FIG. 1 with first and second hydrostatic transmissions mounted thereto.
Figure 10:
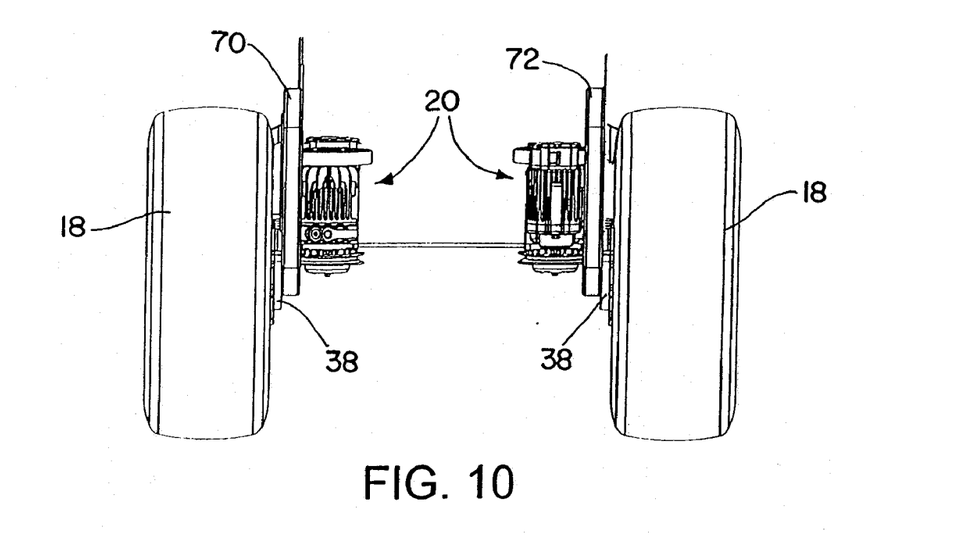
FIG. 10 is a rear view of the frame of the mower of FIG. 1 with first and second hydrostatic transmissions mounted thereto.

Turning now to FIGS. 9-12, and initially to FIG. 9, a pair of hydrostatic transmissions 20 as just described are illustrated mounted to the frame 12 of the mower 10. A first hydrostatic transmission 20 is mounted to a left side frame rail 70 and a second hydrostatic transmission 20 is mounted to a right frame side rail 72. Each hydrostatic transmission 20 is mounted such that the pump shaft 28 extends vertically while the motor shaft 60 extends horizontally outwardly from the respective frame side rail 70, 72.

It will be appreciated that the left and right hydrostatic transmissions 20 in the illustrated embodiment are identical units capable of being mounted on either the left or right frame side rail 70, 72 without modification, by rotating the hydrostatic transmission 180 degrees about its vertical axis. In this regard, the fan 32 on the left side hydrostatic transmission 20 is located at a rearward location while the fan 32 on the right side hydrostatic transmission 20 is located at a forward position.

Figure 11:
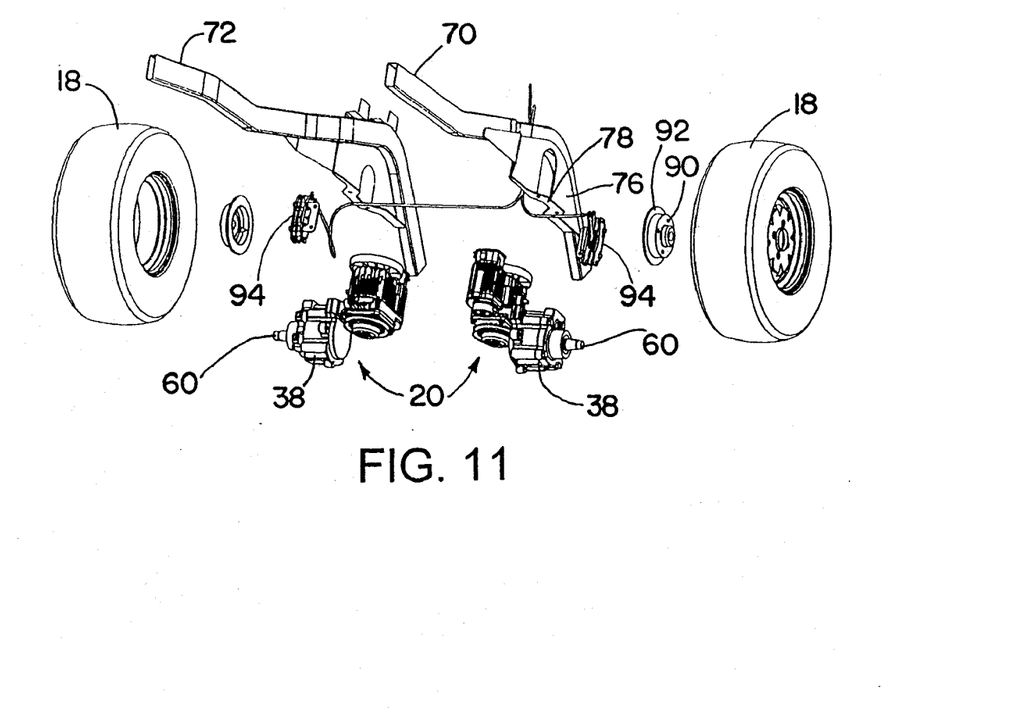
FIG. 11 is an assembly view of the frame of the mower of FIG. 1 including the first and second hydrostatic transmissions.

In FIG. 11, the mounting of the hydrostatic transmissions 20 to the frame 12 is illustrated. Some components of the mower 10 and frame 12 have been omitted for clarity. The frame 12 includes longitudinally extending left side rail 70 and right side rail 72. Both left and right side rail members 70, 72 have a mounting surface 76 for supporting the hydrostatic transmissions 20. In the illustrated embodiment, the mounting surface 76 is part of a bracket secured to each frame side rail 70, 72. Alternatively, the mounting surface 76 can be a portion of the frame side rail 70, 72. Each illustrated mounting surface 76 includes a flange portion 78 extending outwardly from the mounting surface 76 at a generally right angle for mating with mounting surface 50 on respective hydrostatic transmissions 20. The flange portions 78 include two bores for receiving bolts or other suitable fasteners for securing the hydrostatic transmissions 20 thereto. The bolts extend through the flange portion into bores 52 in the mount surface 50 of each hydrostatic transmission 20.

Once secured to a side rail 70, 72, the pump housing portions 24 of the hydrostatic transmissions 20 are located inwardly of the side frame rails 70, 72 towards a longitudinal centerline of the frame 12. The motor housing portions 38 extend outwardly from respective side rails 70 and 72 away from the longitudinal centerline of the frame 12.

The hydrostatic transmissions 20 are configured to be mounted to the frame side rails 70, 72 such that the motor housing portions 38 hang from the mounting bracket 76 and extend outwardly from the frame 12 (e.g., side rails 70, 72) for facilitating direct connection of the motor output shafts 60 to respective wheels 18. To provide lateral support to the motor housing portion 38 of each hydrostatic transmission 20, a stabilizer bar (not shown) can be provided between the motor housing portions 38 of each hydrostatic transmission 20. Such a stabilizer bar can be configured generally to resist torsional loads applied to the hydrostatic transmissions 20, such as by the vehicle weight acting on the motor output shafts 60.

Each motor output shaft 60 is connected to a respective wheel 18 via a hub member 90 that is secured to the motor output shaft 60 by a key or other suitable means. The hub member 90 in the illustrated embodiment includes a brake rotor 92 to be engaged by calipers 94 to effect braking of each respective wheel 18 in a conventional manner.

Figure 12:
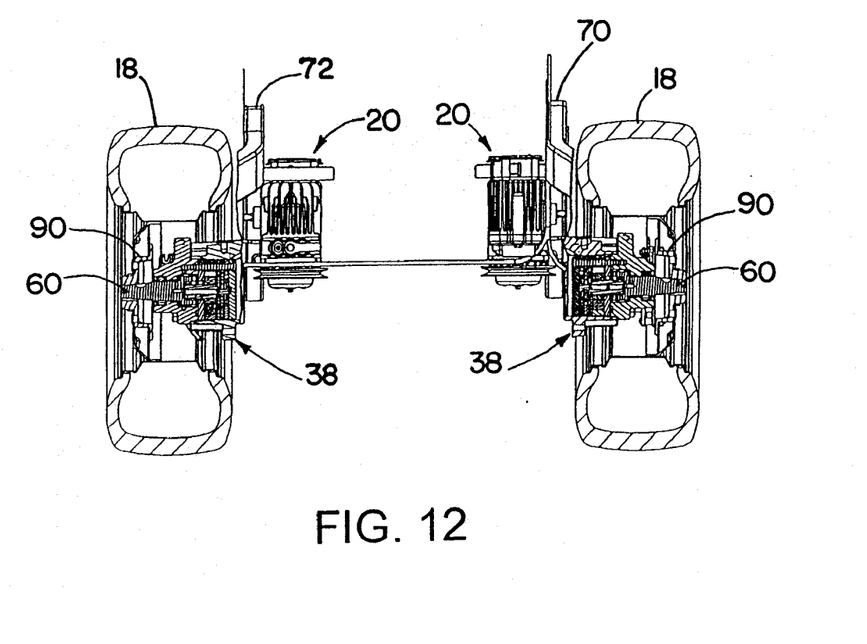
FIG. 12 is a cross-sectional view taken along the line 12-12 in FIG. 9.

Turning now to FIG. 12, it will now be appreciated that when the hydrostatic transmissions 20 are mounted to the left and right side rails 70, 72 of the frame 12, the pump housing portions 24 are located within the frame side rails 70, 72, while the motor housing portions 38 are located outside the frame side rails 70, 72. The motor housing portions 38 are at least partially received within wheel wells of respective wheels 18, and the motor output shafts 60 are directly connected to respective wheels 18 for independently driving the same. It will be appreciated that the wheel well of each wheel is generally defined as the space within the rim portion of the wheel 18.

It will be appreciated that locating the motor housing portions 38 at least partially received within the wheels 18 utilizes otherwise wasted space within the wheels 18. This can be advantageous for smaller applications, such as consumer zero-turn-radius mowers. Further, the motor housing portions 38 may be exposed to lower temperatures and greater air flow outside of the frame 12 thereby facilitating greater heat dissipation from the hydrostatic transmissions 20.

It will further be appreciated that locating the pump portion within the frame 12 with the input pulley 30 on a lower side thereof facilitates connection of the IHT 20 to the prime mover. In general, such configuration allows the prime mover to be mounted lower in a vehicle thereby lowering the center of gravity of the vehicle and, for mowers having under-seat motors, facilitates lowering the seat height.

The general T-shape of the IHT 20, with the motor portion of the housing forming the stem of the T-shape, results in the IHT 20 generally extending fore and aft of the output shaft about an equal distance. As such, the left side and right side IHTs 20 generally occupy a longitudinally coextensive space within the mower 10. This general symmetry about the longitudinal center line of the mower can make designing a mower more convenient.

Figure 13:
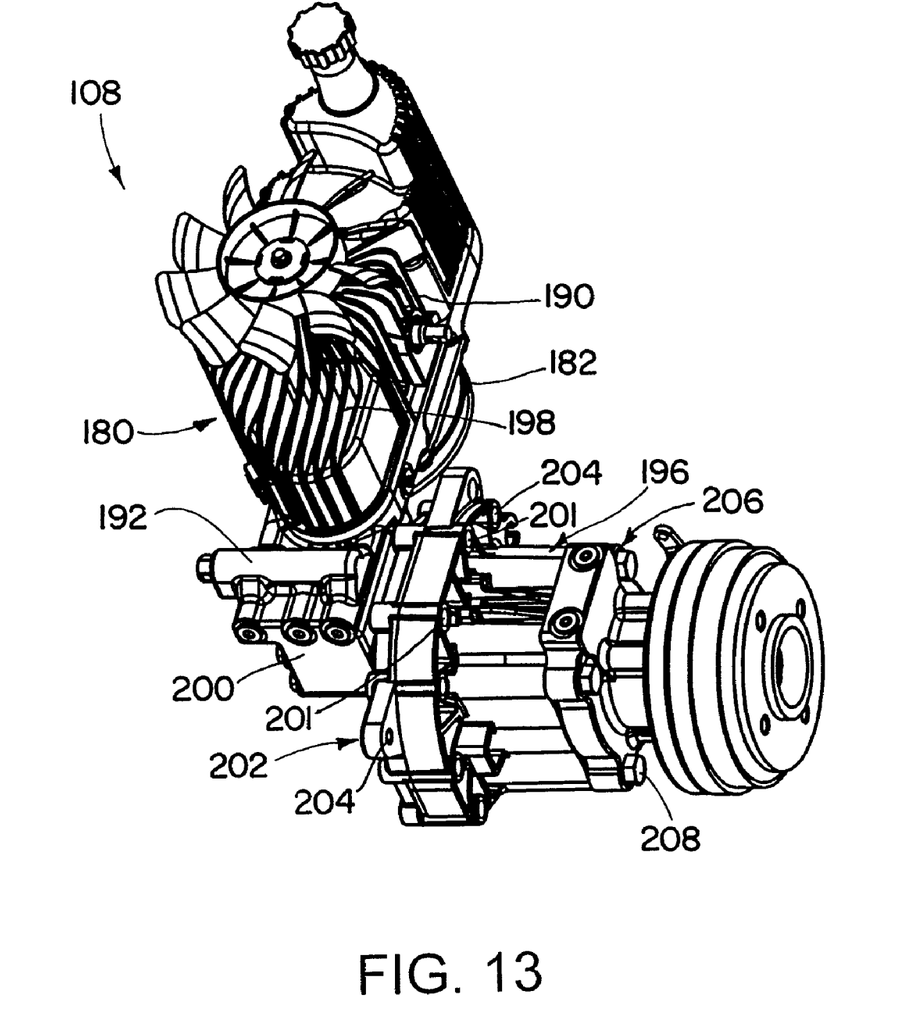
FIG. 13 is perspective view of another hydrostatic transmission in accordance with the invention.
Figure 14:
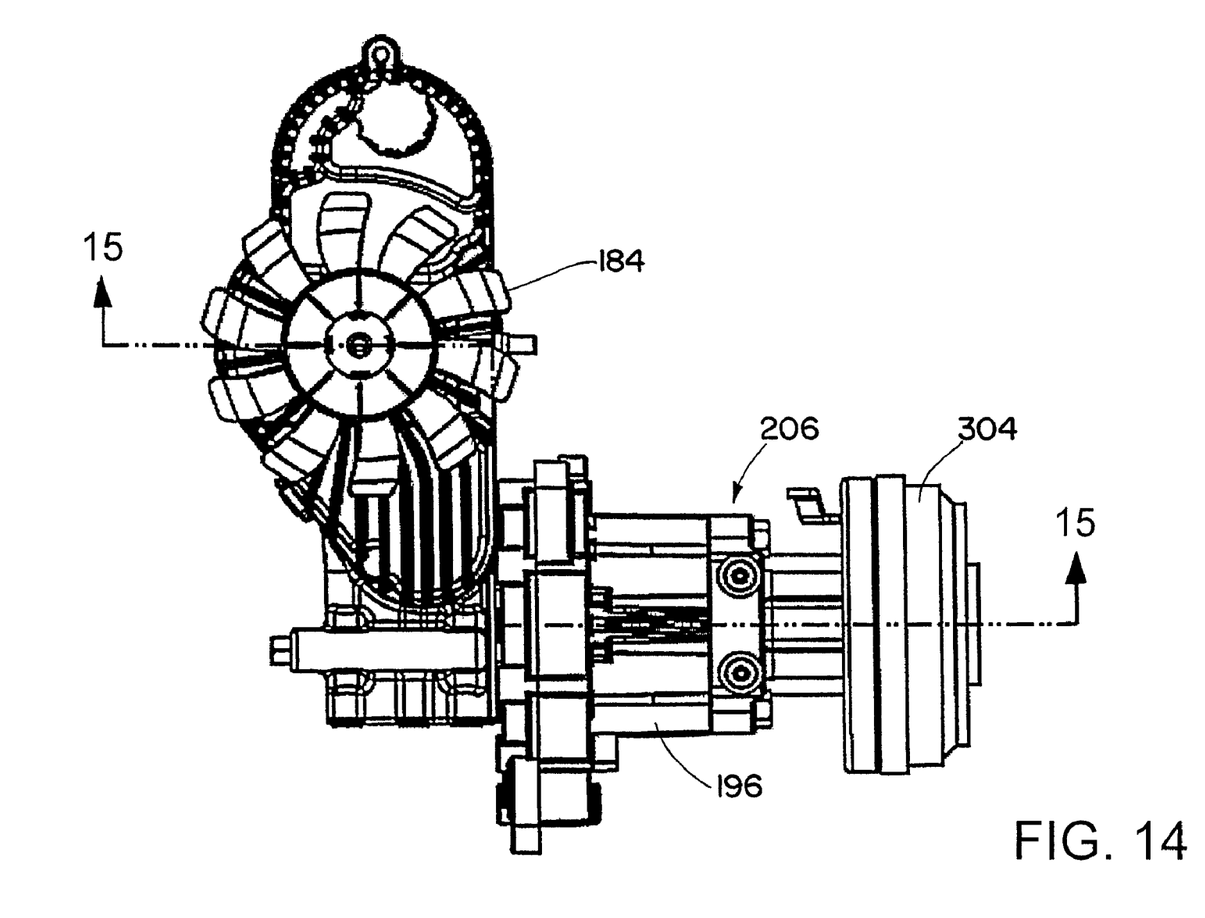
FIG. 14 is a plan view of the hydrostatic transmission of FIG. 13.
Figure 15:
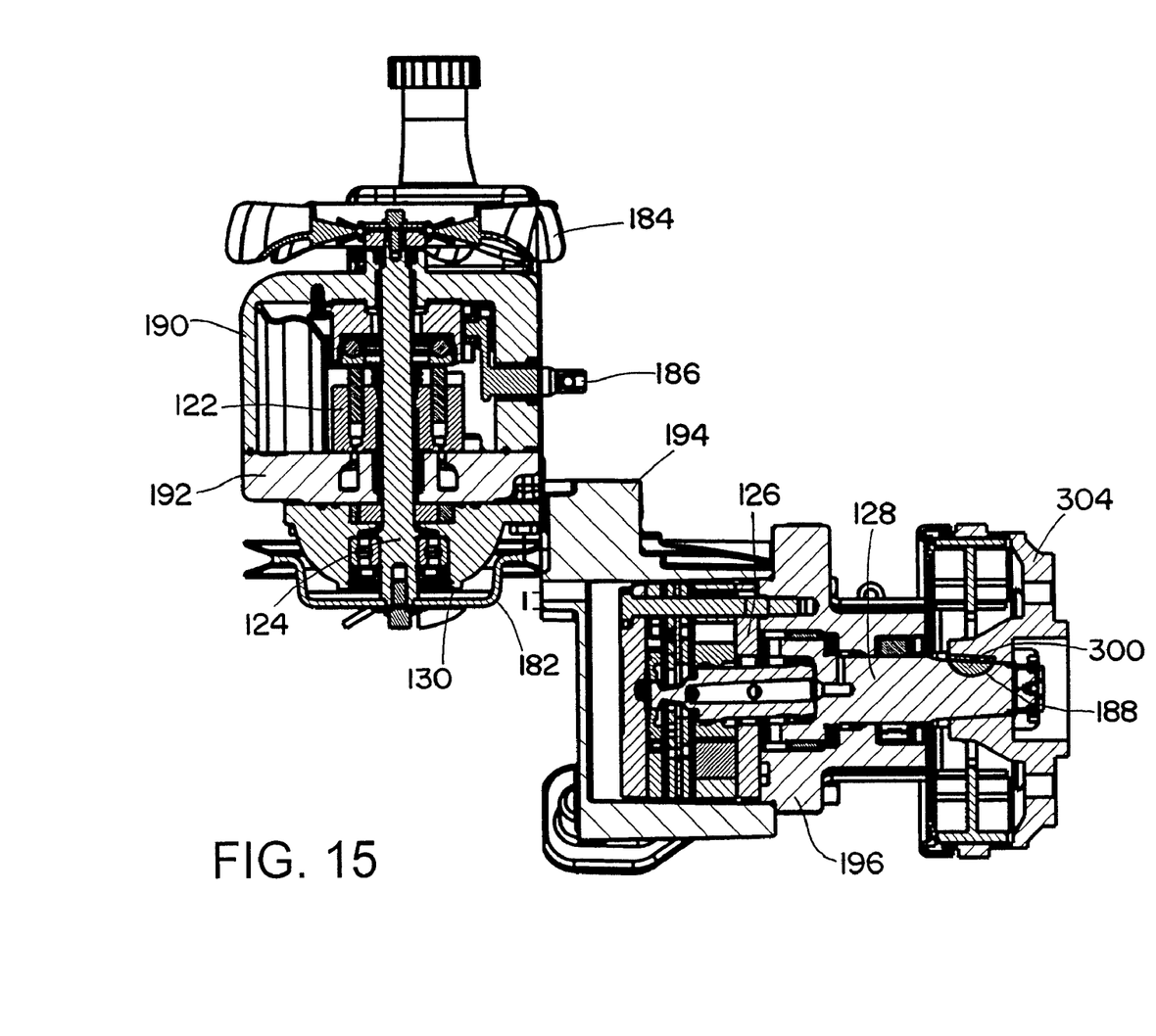
FIG. 15 is a cross-sectional view of the hydrostatic transmission of FIG. 14 taken along the 15-15.

Turning now to FIGS. 13-15, another hydrostatic transmission in accordance with the invention is illustrated. The hydrostatic transmission 108 is similar to the hydrostatic transmission shown and described in connection with FIGS. 1-12 and includes an IHT housing 180. A pump input shaft 124 extends from opposing sides of the IHT housing 180. A pulley 182 is provided on the lower end of the shaft 124 for connection via a belt, or other suitable means, to a prime mover such as the internal combustion engine of the mower 10. A fan 184 is secured to the upper end of the pump shaft 124 and is configured to draw air across the hydrostatic transmission 108 for cooling purposes. A trunnion arm 186 extends from housing 180 and is configured to actuate a swash block to control the flow direction and flow rate of the pump element 122 in a conventional manner. The trunnion 186 can be connected to the controls 15 of the mower 10 directly or via a suitable linkage.

A motor output shaft 128 extends from the IHT housing 180 and is supported therein by one or more bearings. The motor output shaft 128 includes a key way 188 for receiving a key 300 for securing a hub 304 of a wheel directly to the output shaft 128 for rotation therewith.

The IHT housing 180 is generally formed by four components including an external pump housing 190, a pump end block 192, a nose cup 194, and a motor housing 196. The pump element 122 is mounted to the pump end block 192 and surrounded by the external pump housing 190, which is also secured to the end block 192. The external pump housing 190 includes a plurality of cooling fins 198 on its exterior surface for dissipating heat generated by the hydrostatic transmission 108.

In the illustrated embodiment, the pump end block 192 and external pump housing 190 together fully enclose the pump element 122. The pump end block 192 can include several passageways (e.g., supply and return lines) therein for the supply and return of the fluid between the pump element 122 and the motor element 126, etc. In this regard, the pump end block 192 has an extension 200 through which passageways extend. An external surface 202 of the extension 200 is exposed to the environment for dissipating heat generated during operation of the IHT 108.

The interior of the external pump housing 190 is typically filled with hydraulic fluid and serves as a sump. An oil filter for filtering the fluid of the hydrostatic transmission 108 can be mounted to the pump end block 192 and contained within the external pump housing 198. The oil filter, can be accessed from a side of the pump end block 192 thereby allowing easy replacement. A charge pump 130 is mounted to the end block 192 and draws fluid from the sump via the filter to provide makeup flow to the closed loop of the hydrostatic transmission.

The pump end block 192 and nose cup 194 are connected together with a pair of bolts 201 that extend through bores in the nose cup 194. The nose cup 194 includes passageways (e.g., supply and/or return line) for supplying and returning fluid between the pump element 122 and the motor element 126. The nose cup 194 includes a mounting surface 202 and bolt holes 204 for mounting the IHT 108 to the frame of a vehicle, for example.

The motor element 126 is supported within the motor housing 196. Together, the motor element 126 and motor housing 196 form a motor module 206 that is received within a tubular portion of the nose cup 194 and secured thereto as a unit via bolts 208, for example.

It will be appreciated that the motor module 206 in this embodiment is also designed to be easily installed as a unit (e.g., mounted to the nose cup 194) to form the IHT 108. Accordingly, motor modules 206 with different characteristics can be installed depending on a given application. For example, various motor modules 206 with motor elements 126 of different displacements can be provided, and a motor module 206 having a motor element 126 with desired displacement can then be selected and installed in the IHT 108 by an end user or vehicle manufacturer. This allows flexibility in manufacturing by allowing an end user or vehicle manufacturer to select a motor module 206 having a desired displacement. Thus, the IHT 108 can be configured to operate in a variety of vehicles and/or applications simply by installing a desired motor module 206. Further, should a motor element 126 require servicing or replacement, the motor module 206 can simply be removed from the IHT 108 to be repaired or replaced.

Figure 16:
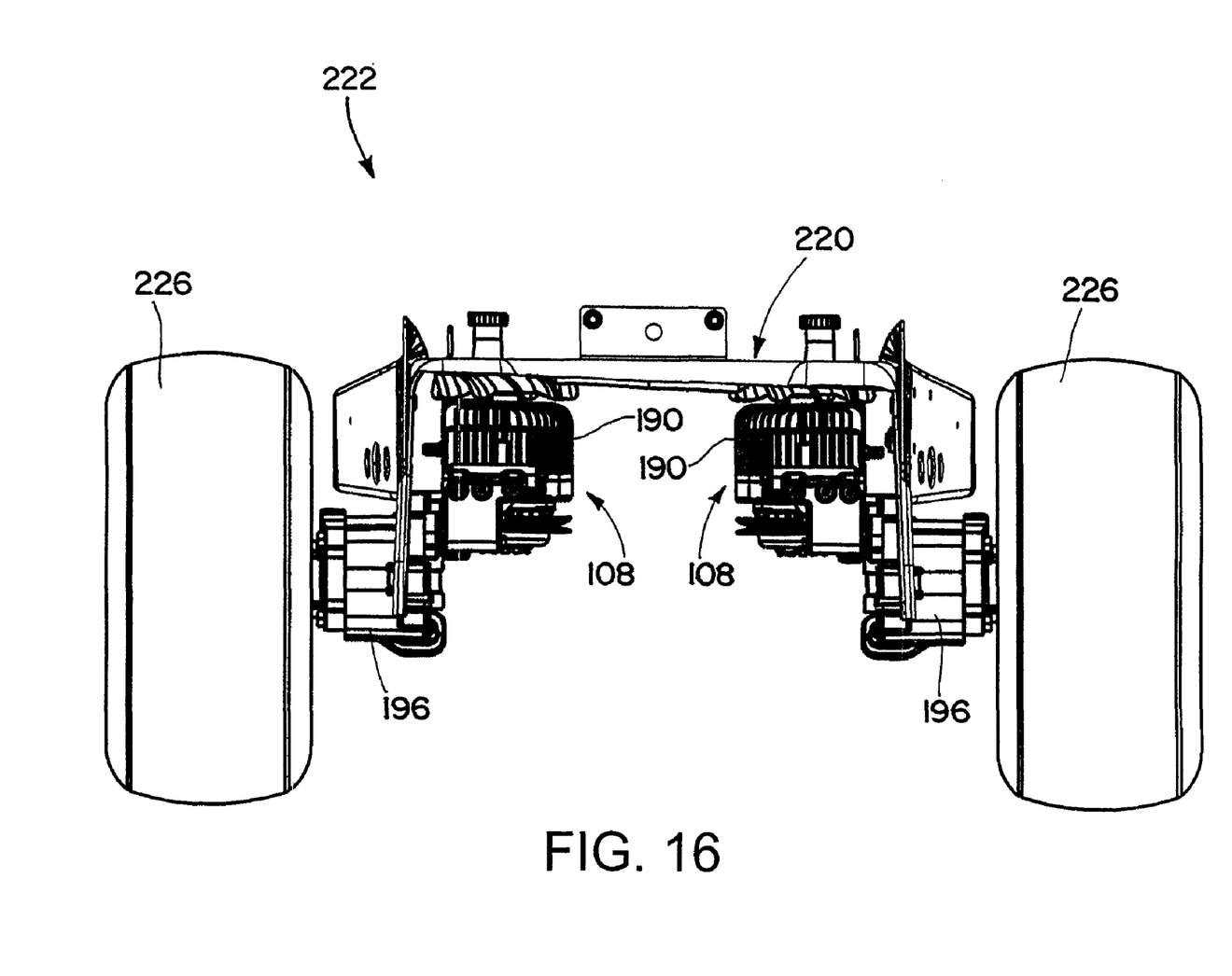
FIG. 16 is a rear view of the frame of the mower of FIG. 1 with first and second hydrostatic transmissions mounted thereto.
Figure 17:
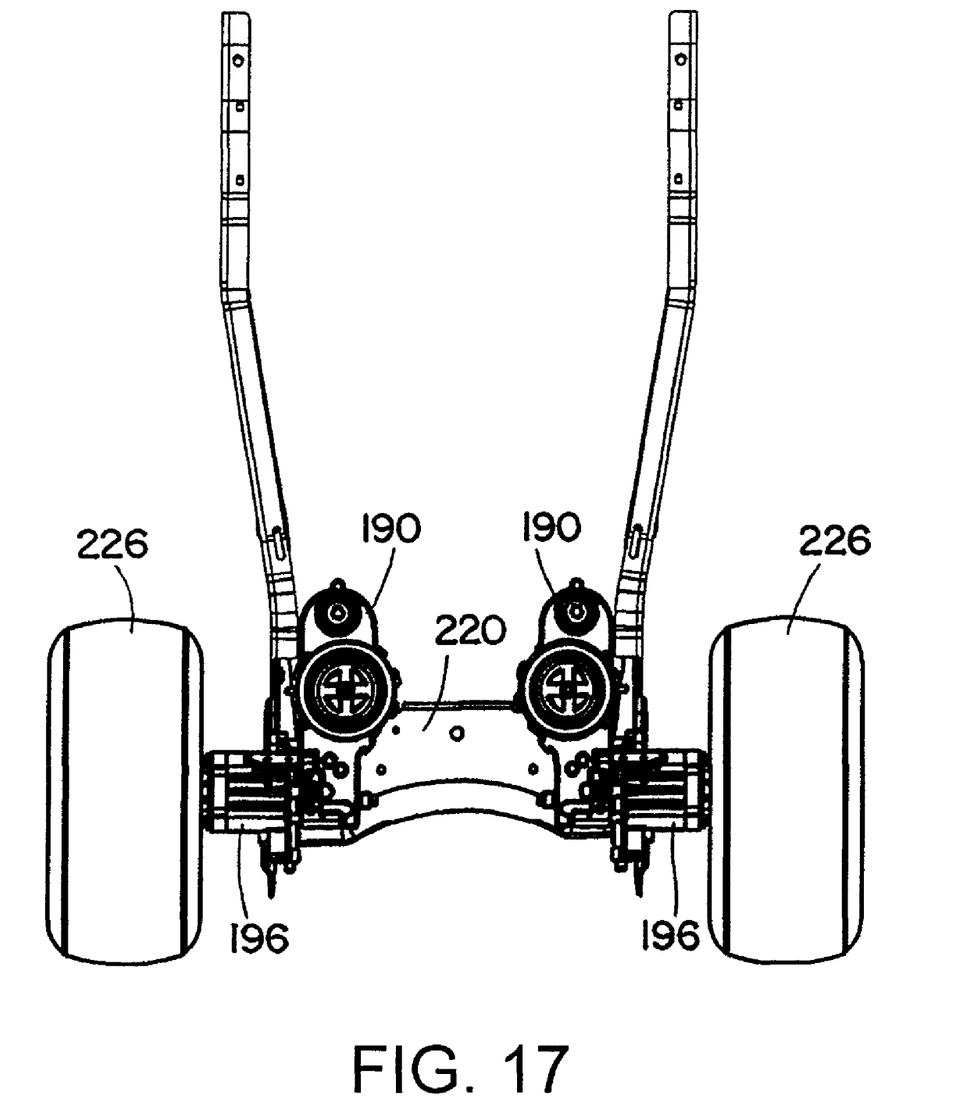
FIG. 17 is a bottom view of the frame of the mower of FIG. 1 with first and second hydrostatic transmissions mounted thereto.

Turning now to FIGS. 16 and 17, a pair of IHTs 108 are illustrated mounted to a frame 220 of a vehicle 222. It will be appreciated that in this embodiment the IHTs 108 are not identical units but are rather mirror images of each other. Each IHT 108 is mounted to a respective side of the frame 220 such that respective motor portions of the housing 196 extend outwardly from the frame 220. Respective wheels 226 are secured to the hubs 304 of each respective IHT 108. The pump portion of each IHT 108 extends upwardly from the mount location on the frame 220 (e.g., above the point of attachment of the mounting surface 202).

The input pulley 182 of each IHT 108 is provided on the lower end of the shaft 124 (e.g., below the pump portion) for connection via a belt, or other suitable means, to a prime mover such as the internal combustion engine of the mower 10. The location of the input pulley 182 facilitates mounting the prime mover (e.g., an internal combustion engine) lower in the vehicle thereby lowering the center of gravity of the vehicle and enabling a lower seat height.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A vehicle comprising:
a frame;
a first hydrostatic transmission supported by the frame, the first hydrostatic transmission having a housing assembly and a rotatably driven output shaft;
a first wheel mounted to the output shaft of the first hydrostatic transmission for supporting the vehicle for movement over a surface, the first wheel located on a first side of the vehicle;
a second hydrostatic transmission supported by the frame, the second hydrostatic transmission having a housing assembly and a rotatably driven output shaft;
a second wheel mounted to the output shaft of the second hydrostatic transmission for supporting the vehicle for movement over a surface, the second wheel located on a second side of the vehicle opposite the first side; and
wherein the first and second hydrostatic transmissions are identical, each further comprising an input shaft and an input drive wheel connected to the input shaft for rotatably driving the input shaft, the input drive wheel mounted to the input shaft on a lower side of the housing assembly.

2. A vehicle as set forth in claim 1, wherein the input shafts of the first and second hydrostatic transmissions extend from the housing assembly perpendiculary to the output shaft.

3. A vehicle as set forth in claim 1, wherein the output shafts of the first and second hydrostatic transmissions extend generally from the housing assembly along a central transverse axis of the housing assembly, whereby the housing assembly extends generally the same distance fore and aft of the output shaft.

4. A vehicle as set forth in claim 1, wherein the housing assembly of the first and second hydrostatic transmissions has a general T-shape with the output shaft forming part of a stem portion of the T-shape.

5. A vehicle as set forth in claim 1, wherein the output shaft of the first and second hydrostatic transmissions is a rotatably driven shaft of a motor, and wherein a distal end of the output shaft is configured to be an axle for supporting the wheel when connected thereto.

6. A vehicle as set forth in claim 1, wherein the housing assembly of the first and second hydrostatic transmissions has a motor portion, and wherein the motor portion is outboard of the frame.

7. A vehicle as set forth in claim 1, wherein the housing assembly of the first and second hydrostatic transmissions has a motor portion, and wherein the motor portion of the housing assembly of each hydrostatic transmission are at least partially received within respective rims of the first and second wheels.

8. A vehicle as set forth in claim 1, wherein the first and second hydrostatic transmissions further include a trunnion arm for controlling speed and direction of rotation of the output shaft, the trunnion arm of each hydrostatic transmission extending from the housing assembly on the same side as the output shaft.

9. A vehicle as set forth in claim 1, wherein the first and second hydrostatic transmissions include a variable flow reversible piston pump.

10. A vehicle as set forth in claim 1, wherein the first and second hydrostatic transmissions include a gerotor motor.

11. A hydrostatic transmission for driving a drive wheel of a vehicle comprising:
a housing assembly mountable as a unit to a frame of a vehicle for driving a left side or right side drive wheel;
a pump supported within a pump portion of the housing assembly and configured to be driven by an input shaft of the hydrostatic transmission; and
a motor supported within a motor portion of the housing assembly and connected to the pump via supply and return lines, the motor configured to drive an output shaft of the hydrostatic transmission; and
wherein the housing assembly includes a mounting surface for enabling the hydrostatic transmission to be secured to the frame such that
the output shaft and motor portion of the housing assembly extend outwardly from the frame so that when the output shaft is connected to a drive wheel, the motor portion of the housing assembly is at least partially received within the drive wheel; and
the pump portion of the housing assembly extends upwardly from the mounting surface; and
further comprising an input drive wheel connected to the input shaft for rotatably driving the input shaft, the input drive wheel mounted to the input shaft on a lower side of the pump portion of the housing assembly.

12. A hydrostatic transmission for driving a drive wheel of a vehicle as set forth in claim 11, wherein the output shaft extends generally from the housing assembly along a central transverse axis of the housing assembly, whereby the housing assembly extends generally the same distance fore and aft of the output shaft.

13. A hydrostatic transmission for driving a drive wheel of a vehicle as set forth in claim 11, wherein the housing assembly has a general T-shape with the output shaft forming a stem portion of the T-shape.

14. A hydrostatic transmission for driving a drive wheel of a vehicle as set forth in claim 11, wherein the output shaft is a rotatably driven shaft of the motor, and wherein a distal end of the output shaft is configured to be an axle for supporting the drive wheel when connected thereto.

15. A hydrostatic transmission for driving a drive wheel of a vehicle as set forth in claim 11, wherein a trunnion arm for controlling the pump extends from a side of the housing assembly in a common direction with the output shaft.

16. A hydrostatic transmission for driving a drive wheel of a vehicle as set forth in claim 11, wherein the pump is a variable flow reversible piston pump.

17. A hydrostatic transmission for driving a drive wheel of a vehicle as set forth in claim 11, wherein the motor is a gerotor motor.

18. A vehicle comprising a frame, a first hydrostatic transmission as set forth in claim 11 mounted to a first side of the frame for driving a first drive wheel configured to support the vehicle for movement over a surface, and a second hydrostatic transmission as set forth in claim 11 mounted to a second side of the frame opposite the first side for driving a second drive wheel configured to support the vehicle for movement over a surface.

19. A vehicle comprising:
a frame;
a first hydrostatic transmission supported by the frame and configured to drive a first drive wheel mounted on a first side of the vehicle;
a second hydrostatic transmission supported by the frame and configured to drive a second drive wheel mounted on a second side of the vehicle opposite the first side;
wherein the first and second hydrostatic transmissions each comprise:
a housing assembly mountable as a unit to the frame of the vehicle;
a pump supported within a pump portion of the housing assembly and configured to be driven by an input shaft of the hydrostatic transmission; and
a motor supported within a motor portion of the housing assembly and connected to the pump via supply and return lines, the motor configured to drive an output shaft of the hydrostatic transmission;
wherein the housing assembly includes a mounting surface for securing the hydrostatic transmission to the frame such that
the output shaft and motor portion of the housing assembly extend outwardly from the frame and are at least partially received within the drive wheel, and
the pump portion of the housing assembly extends upwardly from the motor portion; and
wherein the first and second transmissions further comprise an input drive wheel connected to the input shaft for rotatably driving the input shaft, the input shaft extending from the lower surface of the pump portion of the housing assembly, and the input drive wheel mounted to the input shaft on a lower side of the pump portion of the housing assembly.

20. A vehicle as set forth in claim 19, wherein the output shafts of the first and second hydrostatic transmissions extend from the housing assembly generally along a central transverse axis of the housing assembly, whereby the housing assembly extends generally the same distance fore and aft of the output shaft.

21. A vehicle as set forth in claim 19, wherein the first and second hydrostatic transmissions have a trunnion arm for controlling the pump, wherein the trunnion arm extends from an outboard side of the housing assembly for connection to a control member of the vehicle.

22. A vehicle as set forth in claim 19, wherein the pump of the first and second hydrostatic transmissions is a variable flow reversible piston pump.

23. A vehicle as set forth in claim 19, wherein the motor of the first and second hydrostatic transmissions is a gerotor motor.

* * * * *